United States Patent
Shozo

(10) Patent No.: US 6,906,291 B2
(45) Date of Patent: Jun. 14, 2005

(54) OVERHEATED STEAM OVEN

(75) Inventor: Kobayashi Shozo, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/829,249

(22) Filed: Apr. 22, 2004

(65) Prior Publication Data
US 2005/0051530 A1 Mar. 10, 2005

(30) Foreign Application Priority Data
Sep. 9, 2003 (KR) .................... 10-2003-0063010

(51) Int. Cl.⁷ .................................. A21B 1/24
(52) U.S. Cl. .............. 219/401; 219/400; 219/402; 392/394; 392/397; 126/369; 126/369.1; 126/348; 99/467; 99/468; 99/473
(58) Field of Search ................. 219/400, 401, 219/402; 392/394, 397, 398, 401, 402; 126/369, 369.1, 369.2, 348; 99/467–468, 473–474

(56) References Cited
U.S. PATENT DOCUMENTS 5,158,064 A * 10/1992 Willis et al. ............. 126/20
5,515,773 A * 5/1996 Bullard .................... 99/330
5,649,476 A * 7/1997 Montagnino et al. ...... 99/415
6,040,564 A * 3/2000 Ueda et al. ............. 219/682

OTHER PUBLICATIONS

T. Junzo et al., Steam Cooking Device, 5–256455 Patent Abstracts of Japan, Oct. 5, 1993, 1 page.

* cited by examiner

Primary Examiner—Shawntina Fuqua
(74) Attorney, Agent, or Firm—Staas & Halsey LLP

(57) ABSTRACT

An overheated steam oven including a cabinet to define a cooking cavity therein, and an overheated steam generator to supply overheated steam into the cooking cavity. The overheated steam generator includes a first vessel containing a predetermined amount of water therein, and a second vessel of which an upper portion is placed in the first vessel, so that an inlet provided at the upper portion of the second vessel communicates with an interior of the first vessel. The second vessel has an outlet provided at a lower portion of the second vessel and connected to the cooking cavity. The overheated steam generator further includes a first heater which is installed in the first vessel to be immersed in the water contained in the first vessel to generate steam, and a second heater which is installed in the second vessel to overheat the steam generated by the first heater.

21 Claims, 4 Drawing Sheets

OVERHEATED STEAM OVEN

CROSS-REFERENCE TO RELATED APPLICATIONS

This application claims the benefit of Korean Patent Application No. 2003-63010, filed Sep. 9, 2003 in the Korean Intellectual Property Office, the disclosures of which are incorporated herein by reference.

BACKGROUND OF THE INVENTION

1. Field of the Invention

The present invention relates, in general, to overheated steam ovens and, more particularly, to an overheated steam oven which is suitable for home use by simplifying a construction and reducing a size of the overheated steam oven.

2. Description of the Related Art

Generally, to cook foods, the foods may be roasted by heat, such as in a gas oven, the foods may be steamed by vapor, such as in a steaming vessel, or the foods may be boiled with water, such as in a cooking vessel. Also, there are methods to cook foods using microwaves, far infrared rays, and overheated steam, etc.

Cooking using the gas ovens may relatively evenly heat foods in the gas oven. However, this method is problematic in that a taste of the foods deteriorates due to oxidation resulting from the food contacting oxygen in air. Cooking using vapor needs plenty of water, but this method risks that the foods may be insipid do to some water being absorbed into the foods during cooking. Cooking using the cooking vessels have a problem in that the foods may be burnt by overheating a part of the foods. Cooking using microwaves or far infrared rays require the foods to be rotated due to fixed radiating directions of the microwaves or the far infrared rays. Further control of a temperature of the food is difficult using these methods, and the foods may easily dry during cooking. In summary, to appropriately cook foods, cooking apparatuses must evenly heat the foods at suitable temperatures. However, the above-mentioned conventional cooking methods are difficult to satisfy cooking conditions in that the temperature must be appropriately maintained.

Cooking using overheated steam is a method in that overheated steam is discharged into a cooking cavity. Since cooking using overheated steam evenly heats foods, the foods may not be partially burnt, and a cooking temperature is easily controlled by controlling a volume of the discharged overheated steam. Also, since oxidation of foods does not occur, cooking using the overheated steam has an advantage in that cooked foods have a better taste.

However, conventional cooking apparatuses using the overheated steam include a cooking cavity to contain foods therein, a steam boiler to generate the overheated steam, a water tank to supply water into the steam boiler, and a plurality of steam pipes to discharge the overheated steam generated by the steam boiler into the cooking cavity. Hence, cooking apparatuses are complex and costly. Accordingly, the conventional cooking apparatuses using overheated steam are both difficult to use at home and in a wide open establishment, as in a large restaurant for business. Also, in the conventional overheated steam cooking apparatuses, the overheated steam generated by the steam boiler is discharged into the cooking cavity through the steam pipes, resulting in increased heat loss.

SUMMARY OF THE INVENTION

Accordingly, it is an aspect of the present invention to provide an overheated steam oven, which is suitable for home use by simplifying a construction and reducing a size of the overheated steam oven.

It is another aspect of the present invention to provide an overheated steam oven which effectively reduces heat loss due to an insulating construction thereof.

Additional aspects and/or advantages of the invention will be set forth in part in the description which follows and, in part, will be obvious from the description, or may be learned by practice of the invention.

The above and/or other aspects are achieved by providing an overheated steam oven, having a cabinet to define a cooking cavity therein, and an overheated steam generator to supply overheated steam into the cooking cavity. The overheated steam generator includes a first vessel containing a predetermined amount of water therein, a second vessel of which an upper portion is placed in the first vessel, with an inlet provided at the upper portion of the second vessel and communicating with an interior of the first vessel, and an outlet provided at a lower portion of the second vessel and connected to the cooking cavity, a first heater to generate steam, thus being installed in the first vessel to be immersed in the water contained in the first vessel, and a second heater installed in the second vessel to overheat the steam generated by the first heater, thus producing overheated steam.

The upper portion of the second vessel may have an outer diameter smaller than an inner diameter of the first vessel, and is inserted into the first vessel from a lower end to an upper portion of the first vessel along a central axis of the first vessel.

The first vessel and the second vessel each may be an insulating vessel.

Each of the first and second vessels may include an inner vessel part, and an outer vessel part which surrounds an outer surface of the inner vessel part while being spaced apart from the outer surface of the inner vessel part, with a space between the inner vessel part and the outer vessel part, which is maintained in a vacuum state.

The overheated steam oven may further include a shielding material to fill the space between the inner vessel part and the outer vessel part to intercept radiant heat.

The first vessel may include an upper plate to close an upper end of the first vessel. However, the first heater and the second heater, respectively, have terminals which are extended upward and supported by the upper plate.

The first vessel may include a feed pipe and a drain pipe respectively coupled to the upper plate and the lower end of the first vessel to feed and drain water into and from the first vessel.

The first vessel may include a disk-shaped feed guide plate installed under the upper plate to be spaced apart from the upper plate, thus guiding the water supplied through the feed pipe into the first vessel. The disk-shaped feed guide plate has an outer diameter smaller than the inner diameter of the first vessel and larger than an outer diameter of the second vessel.

The feed guide plate may be made of an insulating material to reduce heat loss of the steam rising from the first vessel.

The first vessel may include a water level sensor coupled to the upper plate and extended in the first vessel to be immersed in the water contained in the first vessel.

The first heater and the second heater each may have a spiral shape.

The second vessel may include a bent part which is formed by bending a lower end of the second vessel toward a rear surface of the cooking cavity. The bent part is connected at a front end thereof to a steam inlet port provided on the rear surface of the cooking cavity.

The first vessel may include an exhaust path provided at an upper portion in the cooking cavity to discharge the steam from the cooking cavity to an outside of the cooking cavity.

Each of walls of the cooking cavity may have a multi-layered panel that comprises a plurality of sheets spaced apart from each other to insulate the cooking cavity.

The above and/or other aspects are achieved by providing an overheated steam oven, having a cabinet to define a cooking cavity therein, and an overheated steam generator to supply overheated steam into the cooking cavity. The overheated steam generator includes a first vessel containing a predetermined amount of water therein, a second vessel with an inlet provided at an upper portion of the second vessel and communicating with an upper portion of the first vessel, and an outlet provided at a lower portion of the second vessel and connected to the cooking cavity, a first heater to generate steam, thus being installed in the first vessel to be immersed in the water contained in the first vessel, and a second heater installed in the second vessel to overheat the steam generated by the first heater.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
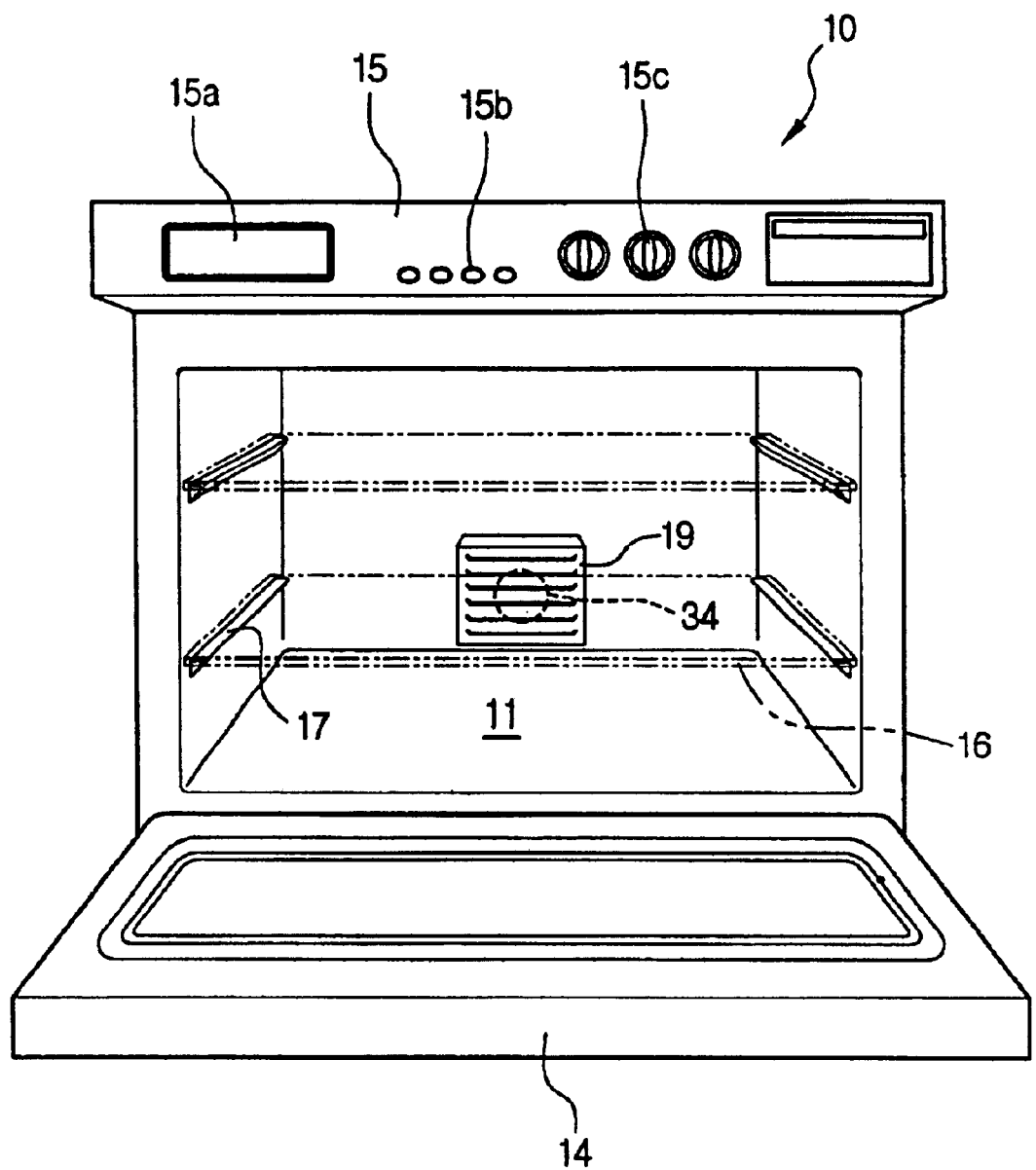
FIG. 1 is a perspective view of an overheated steam oven, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
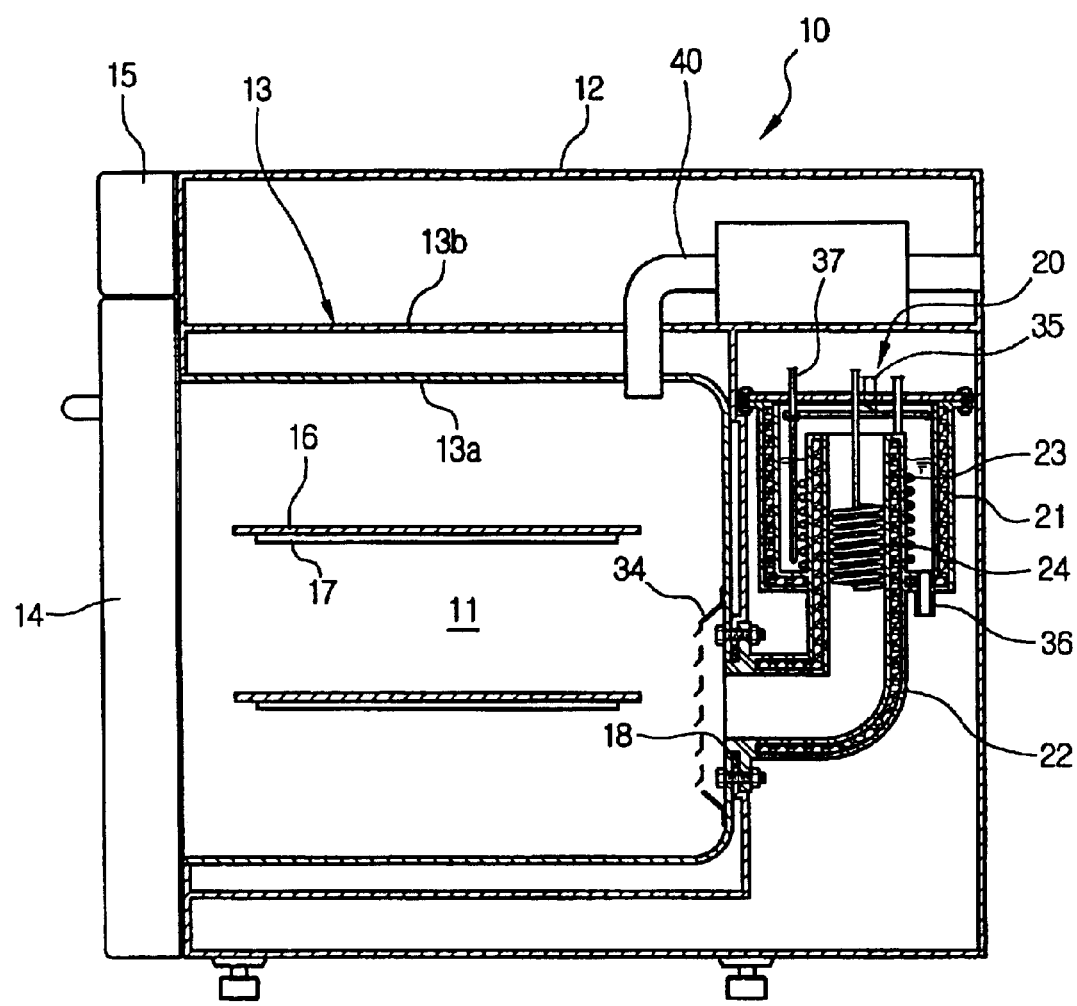
FIG. 2 is a sectional view illustrating an internal construction of the overheated steam oven of FIG. 1.

As shown in FIGS. 1 and 2, an overheated steam oven according to the first embodiment of the present invention includes a cabinet 10 to define a cooking cavity 11 therein, and an overheated steam generator 20 which is mounted to a rear wall in the cooking cavity 11 so as to supply overheated steam into the cooking cavity 11.

The cabinet 10 includes an outer casing 12, and an inner casing 13 which is installed in the outer casing 12 to be spaced apart from the outer casing 12, thus defining the cooking cavity 11 therein. The cooking cavity 11 is open at a front thereof to place and remove foods into and from the cooking cavity 11. Also, the inner casing 13 includes a first casing 13a and a second casing 13b which are spaced apart from each other to insulate the cooking cavity 11 from an outside of the cooking cavity 11. That is, each of walls of the cooking cavity 11 includes a multi-layered panel that has a plurality of sheets spaced apart from each other.

A door 14, which is opened downward and closed upward, is attached to the open front of the cabinet 10 to allow a user to open and close the cooking cavity 11. A control unit 15, which includes a display 15a to display an operational state of the overheated steam oven thereon, various kinds of control buttons 15b, and control switches 15c, are provided at a portion of the cabinet 10 above the door 14.

Upper and lower racks 16 are provided at upper and lower portions in the cooking cavity 11 to respectively support foods. Each of the upper and lower racks 16 is removably installed in the cooking cavity 11 to slide in a drawer-type movement along guide rails 17 which are oppositely formed on inner surfaces of both side walls of the inner casing 13.

Figure 3:
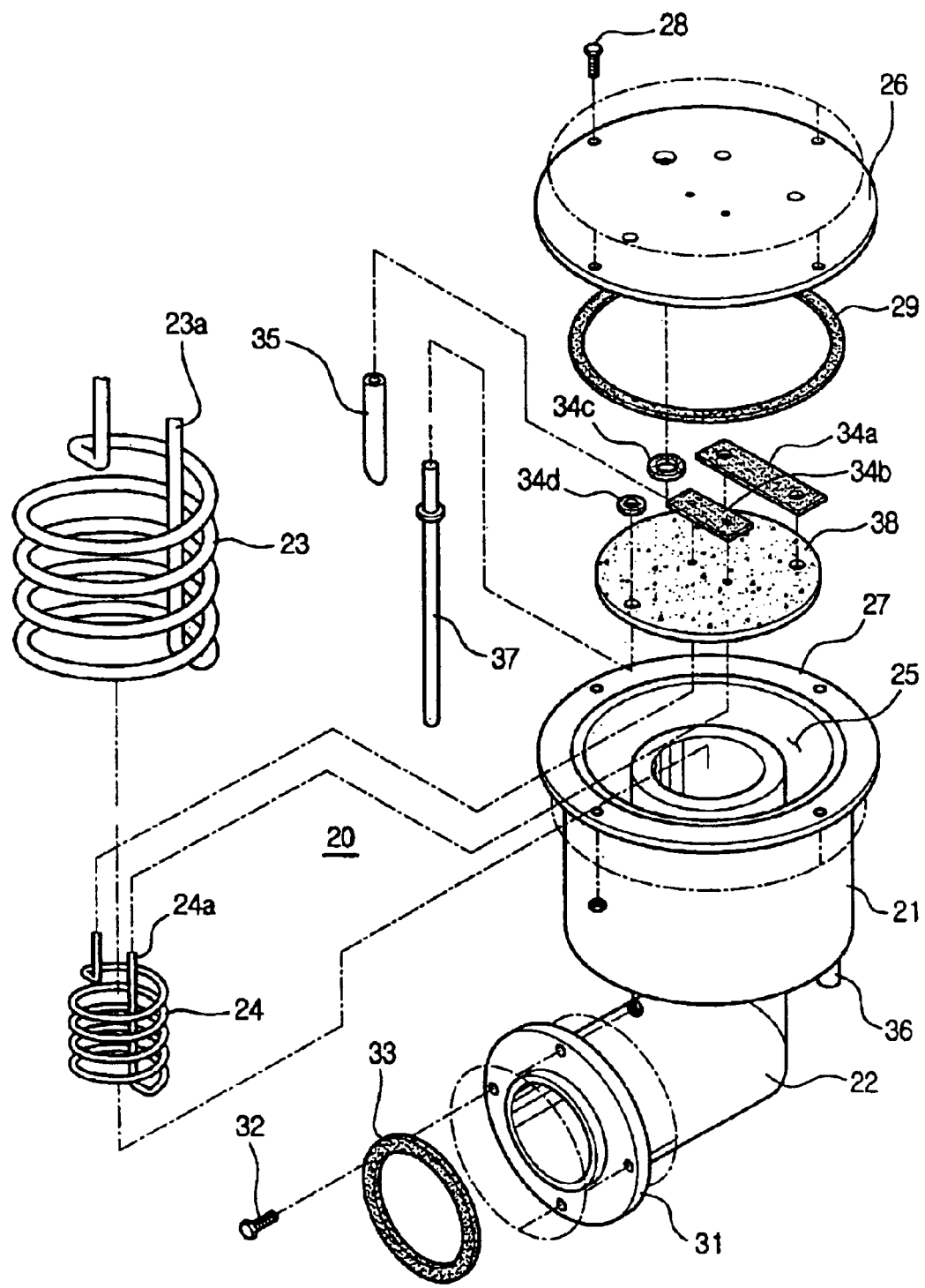
FIG. 3 is an exploded perspective view illustrating a construction of an overheated steam generator of the overheated steam oven of FIG. 2.
Figure 4:
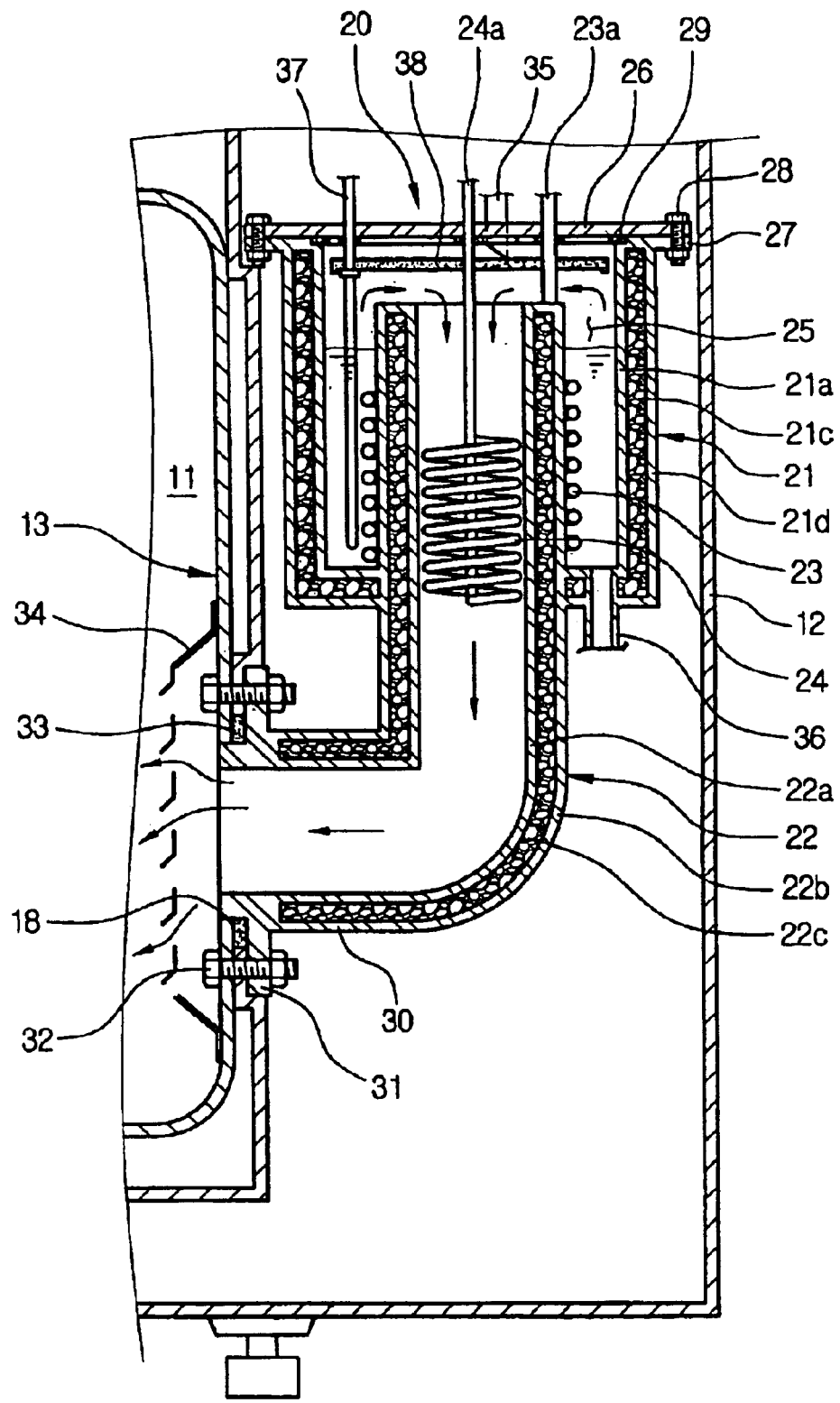
FIG. 4 is a sectional view illustrating the construction of the overheated steam generator of the overheated steam oven of FIG. 2.

As shown in FIGS. 3 and 4, the overheated steam generator 20, which is provided on the rear wall of the cooking cavity 11, includes a first vessel 21 containing a predetermined amount of water therein, and a second vessel 22 of which an upper portion is placed in the first vessel 21 and a lower portion is connected to the rear wall of the cooking cavity 11. The overheated steam generator 20 further includes a first heater 23 which is provided around an outer surface of the second vessel 22 in an interior of the first vessel 21, and a second heater 24 which is installed in the second vessel 22.

The first vessel 21 and the second vessel 22 of the overheated steam generator 20 respectively have cylindrical shapes. The second vessel 22 has an outer diameter smaller than an inner diameter of the first vessel 21. The upper portion of the second vessel 22 is inserted into the first vessel 21 from a lower end to an upper portion of the first vessel 21 along a central axis of the first vessel 21. An inlet, which is provided at the upper portion of the second vessel 22, communicates with the interior of the first vessel 21. The lower end of the first vessel 21 is coupled to the outer surface of the second vessel 22, for example, by welding, so that the first and second vessels 21 and 22 have an integrated structure and the lower end of the first vessel 21 is closed. Due to the above-mentioned construction, the predetermined amount of water is contained in a space formed between the first vessel 21 and the second vessel 22 to generate steam.

The upper portion of the first vessel 21 is closed by an upper plate 26 which is mounted to an upper end of the first vessel 21. To mount the upper plate 26 to the upper end of the first vessel 21, an upper flange 27 is provided around the upper end of the first vessel 21, and the upper plate 26 is mounted to the upper flange 27 by a plurality of locking members 28. At this time, a first packing 29 is interposed between the upper flange 27 and the upper plate 26 to prevent the leakage of steam from the first vessel 21.

In the lower portion of the second vessel 22 which extends to an outside of the first vessel 21, a bent part 30 is formed by bending a lower end of the second vessel 22 toward the rear wall of the cooking cavity 11. A front end of the bent part 30, which is an outlet of the second vessel 22, is connected to a steam inlet port 18 which is provided on the rear wall of the cooking cavity 11. At this time, a lower flange 31, which is provided around the outlet of the second vessel 22, is mounted to a predetermined portion of the inner casing 13 around the steam inlet port 18 by a plurality of locking members 32, with a second packing 33 interposed between the lower flange 31 and the inner casing 13 to prevent the leakage of steam through a junction between the lower flange 31 and the inner casing 13. A cover 34, on which a plurality of steam discharging holes are formed, is mounted to an inner surface of the rear wall of the inner casing 13 defining the cooking cavity 11 to allow the overheated steam generated by the overheated steam generator 20 to be evenly distributed into the cooking cavity 11.

The first vessel 21 and the second vessel 22 are respectively vacuum insulating vessels so that spaces defined therein are insulated from the outside thereof, thus minimizing heat loss. The first vessel 21 and the second vessel 22 respectively include first and second inner vessel parts 21a and 22a, and first and second outer vessel parts 21b and 22b which respectively surround outer surfaces of the first and second inner vessel parts 21a and 22a while being respectively spaced apart from the outer surfaces of the first and second inner vessel parts 21a and 22a. First and second shielding materials 21c and 22c respectively fill the spaces between the first and second inner vessel parts 21a and 22a and the first and second outer vessel parts 21b and 22b to intercept radiant heat. The spaces between the first and second inner vessel parts 21a and 22a and the first and second outer vessel parts 21b and 22b each are sealed in a vacuum state, once the vacuum state is induced.

The first heater 23 is installed around the second vessel 22 in the interior of the first vessel 21 to be immersed in the water contained in the first vessel 21. The first heater 23 has a spiral shape to maximize a heat transferring surface area thereof. The first heater 23 is supported by a first terminal 23a which is provided at the first heater 23 to be extended upward and which is coupled to the upper plate 26. The second heater 24 is installed in the second vessel 22, and also has a spiral shape to maximize a heat transferring surface area thereof. The second heater 24 is supported by a second terminal 24a which is provided at the second heater 24 to be extended upward and which is coupled to the upper plate 26. Also, third and fourth packings 34a and 34b are respectively interposed between the first and second terminals 23a and 24a of the first and second heaters 23 and 24 and the upper plate 26 to prevent the leakage of steam from the first vessel 21 through junctions between the first and second terminals 23a and 24a and the upper plate 26. Due to the above-mentioned construction, the steam generated by an operation of the first heater 23 rises, and passes the second vessel 22 toward the cooking cavity 11. Accordingly, the overheated steam is generated by the second heater 24 which further heats the steam generated by the first heater 23, while the steam passes the second vessel 22 toward the cooking cavity 11.

The overheated steam generator 20 further includes a feed pipe 35 to feed water into the first vessel 21, a drain pipe 36 to drain the water from the first vessel 21, and a water level sensor 37 to monitor a level of the water contained in the first vessel 21. At this time, the feed pipe 35 is connected to the upper plate 26, while the drain pipe 36 is connected to the lower end of the first vessel 21.

Also, a disk-shaped feed guide plate 38 is installed under the upper plate 26 to be spaced apart from the upper plate 26. The disk-shaped feed guide plate 38 has an outer diameter smaller than the inner diameter of the first vessel 21 and larger than the outer diameter of the second vessel 22. The feed guide plate 38 has a function to guide the water supplied through the feed pipe 35 into the first vessel 21, and simultaneously has a function to guide the steam from the interior of the first vessel 21 to the inlet of the second vessel 22. The feed guide plate 38 is made of an insulating material to minimize heat loss of the steam while guiding the steam. The water level sensor 37 extends to a lower portion in the first vessel 21 while passing both the upper plate 26 and the feed guide plate 38. In this state, the water level sensor 37 is supported by the upper plate 26. A fifth packing 34c is interposed between the feed pipe 35 and the upper plate 26, and a sixth packing 34d is interposed between the water level sensor 37 and the upper plate 26, to prevent the leakage of steam from the first vessel 21, through junctions between the feed pipe 35 and the water level sensor 37 and the upper plate 26.

Since the feed pipe 35 is connected to an external water source (not shown), the water is fed into the first vessel 21 through the feed pipe 35. A predetermined water level of the water contained in the first vessel 21 is maintained by controlling the amount of the water supplied from the external water source (not shown) in response to a monitoring operation of the water level sensor 37. Also, a control valve (not shown) may be provided on the drain pipe 36 to controllably drain the residual water from the first vessel 21 after a cooking operation.

As shown in FIG. 2, the overheated steam oven of the present invention further includes an exhaust duct 40 at an upper portion in the cooking cavity 11 to discharge the overheated steam from the cooking cavity 11 to an outside of the cooking cavity 11.

The operation of the overheated steam oven of the present invention will be described hereinbelow.

First, foods are placed on the upper and lower racks 16 of the cooking cavity 11. Thereafter, the overheated steam oven is operated and the water is fed into the first vessel 21 through the feed pipe 35 of the overheated steam generator 20. At this time, the water level in the first vessel 21 is controlled in response to the monitoring operation of the water level sensor 37.

After a predetermined amount of water is fed into the first vessel 21, the water contained in the first vessel 21 is heated by the first heater 23. Accordingly, steam is generated by boiling the water contained in the first vessel 21 by using the first heater 23 which is immersed in the water. Thereafter, overheated steam is generated by further heating the steam by using the second heater 24 while the steam passes the second vessel 22 from the inlet of the second vessel 22 toward the cooking cavity 11. The foods in the cooking cavity 11 are thus cooked by heat of the overheated steam supplied into the cooking cavity 11 through the outlet of the second vessel 22. After cooking is finished, the overheated steam is discharged to the outside of the cooking cavity 11 through the exhaust duct 40 provided at the upper portion of the cooking cavity 11.

In the above-mentioned operation, since the first vessel 21 and the second vessel 22 each have an insulating construction and the outlet of the second vessel 22 is mounted to the rear wall of the cooking cavity 11, the overheated steam oven of the present invention generates overheated steam while minimizing heat loss. In addition, since the overheated steam oven of the present invention rapidly supplies the overheated steam into the cooking cavity 11, energy loss is minimized. Also, since the first heater 23, which has the spiral shape, is immersed in the water contained in the first vessel 21, the overheated steam oven of the present invention rapidly boils the water in the first vessel 21, and since the second heater 24, which also has the spiral shape, further heats the steam, the overheated steam oven of the present invention generates the overheated steam within a short period of time. This two-step process saves energy.

As is apparent from the above description, in an overheated steam oven of the present invention, since an overheated steam generator is mounted on a rear wall of a cooking cavity and the construction of the overheated steam generator is simple in comparison with steam boilers of conventional overheated steam cooking apparatuses etc., the present invention may be simply manufactured at a reduced cost. In addition, the overheated steam oven of the present invention may be used at home due to the simplified construction and reduced size of the overheated steam oven.

Also, since the overheated steam generator has an insulating construction, the overheated steam oven of the present invention generates overheated steam, while minimizing heat loss.

Also, since each of walls of the cooking cavity includes a multi-layered panel that has a plurality of spaced sheets, the overheated steam oven of the present invention further minimizes heat loss by intercepting heat.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An overheated steam oven, including a cabinet to define a cooking cavity therein and an overheated steam generator to supply overheated steam into the cooking cavity, the overheated steam generator comprising:

a first vessel containing a predetermined amount of water therein;

a second vessel, having an upper portion placed in the first vessel and a lower portion;

an inlet, provided at the upper portion of the second vessel, to communicate with an upper portion of the first vessel;

an outlet, provided at the lower portion of the second vessel, to connect to the cooking cavity;

a heater to heat the water contained in the first vessel to cause steam to rise and enter the second vessel, and to overheat the steam entering the second vessel.

2. The overheated steam oven according to claim 1, wherein the upper portion of the second vessel has an outer diameter which is smaller than an inner diameter of the first vessel, and is inserted into the first vessel from a lower end to an upper portion of the first vessel along a central axis of the first vessel.

3. The overheated steam oven according to claim 2, wherein the first vessel and the second vessel each provide insulation.

4. The overheated steam oven according to claim 2, wherein each of the first and second vessels comprises:

an inner vessel part; and an outer vessel part which surrounds and is separated from an outer surface of the inner vessel part, with space between the inner vessel part and the outer vessel part being a vacuum.

5. The overheated steam oven according to claim 4, further comprising a shielding material to fill the space between the inner vessel part and the outer vessel part to intercept radiant heat.

6. The overheated steam oven according to claim 2, wherein the first vessel comprises an upper plate to close an upper end of the first vessel, and the heater include terminal which extend upward and is supported by the upper plate.

7. The overheated steam oven according to claim 6, further comprising a feed pipe and a drain pipe respectively coupled to the upper plate and the lower end of the first vessel, to feed and drain water into and from the first vessel.

8. The overheated steam oven according to claim 7, further comprising a disk-shaped feed guide plate installed under the upper plate to be spaced apart from the upper plate, to guide the water supplied through the feed pipe into the first vessel, the disk-shaped feed guide plate having an outer diameter, which is smaller than the inner diameter of the first vessel and which is larger than the outer diameter of the second vessel.

9. The overheated steam oven according to claim 8, wherein the disk-shaped feed guide plate comprises an insulating material to reduce heat loss of the steam rising from the first vessel.

10. The overheated steam oven according to claim 6, further comprising a water level sensor coupled to the upper plate and extended in the first vessel, to be immersed in the water contained in the first vessel.

11. The overheated steam oven according to claim 1, wherein the heater has a spiral shape.

12. The overheated steam oven according to claim 1, further comprising a feed pipe and a drain pipe respectively coupled to the first vessel.

13. The overheated steam oven according to claim 1, further comprising a water level sensor coupled to the first vessel, to monitor a level of the water contained in the first vessel.

14. The overheated steam oven according to claim 1, wherein the second vessel comprises a bent part which is formed by bending a lower end of the second vessel toward a rear wall of the cooking cavity, the bent part being connected at a front end thereof to a steam inlet port provided on the rear wall of the cooking cavity.

15. The overheated steam oven according to claim 1, further comprising an exhaust path provided at an upper portion in the cooking cavity to discharge the steam from the cooking cavity to an outside of the cooking cavity.

16. The overheated steam oven according to claim 1, wherein each of walls of the cooking cavity comprises a multi-layered panel that comprises a plurality of sheets spaced apart from each other to insulate the cooking cavity.

17. An overheated steam oven, including a cabinet having a cooking cavity therein and an overheated steam generator to supply overheated steam into the cooking cavity, the overheated steam generator comprising:

a first vessel containing water;

a second vessel, having an upper portion placed in the first vessel and a lower portion, with an inlet provided at the upper portion of the second vessel to communicate with an interior of the first vessel;

an outlet, provided at the lower portion of the second vessel, connected to the cooking cavity; and first and second heaters to heat water to cause steam to enter the second vessel, and to overheat the steam which enters the second vessel.

18. The overheated steam oven according to claim 17, wherein the first heater is installed in the first vessel to be immersed in the water contained in the first vessel, and the second heater is installed in the second vessel.

19. The overheated steam oven according to claim 17, wherein the upper portion of the second vessel is inserted into the first vessel from a lower end to an upper portion of the first vessel.

20. An overheated steam oven, including a cabinet to define a cooking cavity therein and an overheated steam generator to supply overheated steam into the cooking cavity, the overheated steam generator comprising:

a first heater to generate steam;

a second heater, inside the first heater, to overheat the generated steam; and a vessel to guide the generated steam towards the second heater so as to allow the generated steam to be heated by the second heater.

21. The overheated steam oven according to claim 20, wherein the second heater is concentric with the first heater.

* * * * *

UNITED STATES PATENT AND TRADEMARK OFFICE
CERTIFICATE OF CORRECTION

PATENT NO. : 6,906,291 B2  
DATED : June 14, 2005  
INVENTOR(S) : Kobayashi Shozo It is certified that error appears in the above-identified patent and that said Letters Patent is hereby corrected as shown below:

<u>Column 8,</u>  
Line 26, change "each of" to -- each of the --.

Signed and Sealed this

Twenty-eighth Day of March, 2006

JON W. DUDAS  
*Director of the United States Patent and Trademark Office*